United States Patent
Kamigama et al.

(10) Patent No.: US 6,680,824 B2
(45) Date of Patent: Jan. 20, 2004

(54) HEAD ARM ASSEMBLY, DISK APPARATUS WITH HEAD ARM ASSEMBLY AND MANUFACTURING METHOD OF HEAD ARM ASSEMBLY

(75) Inventors: Takehiro Kamigama, Tokyo (JP); Ichiro Yagi, Tokyo (JP); Masashi Shiraishi, Tokyo (JP)

(73) Assignee: TDK Corporation, Tokyo (JP)

( * ) Notice: Subject to any disclaimer, the term of this patent is extended or adjusted under 35 U.S.C. 154(b) by 310 days.

(21) Appl. No.: 09/953,184

(22) Filed: Sep. 17, 2001

(65) Prior Publication Data

US 2002/0057535 A1 May 16, 2002

(30) Foreign Application Priority Data

Sep. 19, 2000 (JP) .......................................... 2000-283284

(51) Int. Cl.[7] .............................. G11B 5/48; G11B 5/127
(52) U.S. Cl. ................................................... 360/265.9
(58) Field of Search ........................ 360/265.9, 244.5, 360/244.2, 245.5; 29/603.2

(56) References Cited

U.S. PATENT DOCUMENTS 5,453,315 A * 9/1995 Hamilton et al. ........... 428/209
5,663,854 A * 9/1997 Grill et al. ................ 360/244.4

FOREIGN PATENT DOCUMENTS

| JP | 58-174507 | 10/1983 |
| JP | 59-174508 | 10/1984 |
| JP | 59-174507 | 11/1984 |
| JP | 4-41672 | 2/1992 |

OTHER PUBLICATIONS

Masatoshi Nakayama et al., "Bias Effect on the Formation of Carbon Films by RF–Plasma CVD", Journal of the Ceramic Society of Japan, Intl. Edition, vol. 98–607, pp. 77–79.

* cited by examiner

Primary Examiner—George J. Letscher
(74) Attorney, Agent, or Firm—Burns, Doane, Swecker & Mathis, L.L.P.

(57) ABSTRACT

An HAA has at least one HGA, each including a head slider with at least one head element, a suspension for supporting the head slider, and a lead conductor member electrically connected with the at least one head element, and a main body including at least one actuator arm for supporting the at least one HGA. The main body of the HAA is made of a metal material, and a surface of the main body is coated by a DLC film.

24 Claims, 4 Drawing Sheets

HEAD ARM ASSEMBLY, DISK APPARATUS WITH HEAD ARM ASSEMBLY AND MANUFACTURING METHOD OF HEAD ARM ASSEMBLY

FIELD OF THE INVENTION

The present invention relates to a head arm assembly (HAA) configured by assembling at least one head gimbal assembly (HGA) with at least one head element such as a thin-film magnetic head element or an optical head element and at least one movable arm or actuator arm for supporting the at least one HGA, to a disk apparatus with an HAA, and to a manufacturing method of an HAA.

DESCRIPTION OF THE RELATED ART

In a magnetic hard disk apparatus, thin-film magnetic head elements for writing magnetic information into and/or reading magnetic information from magnetic disks are in general formed on magnetic head sliders flying in operation above the rotating magnetic disks. The sliders are supported at top end sections of suspensions of HGAs, respectively.

The HGAs are attached to top end sections of actuator arms driven to swing by an actuator or a voice coil motor (VCM) so as to seek a track on a magnetic hard disk. In most cases, a main body of an HAA, which consists of actuator arms and a base section coupled to the arms, is made of a metal material such as an aluminum material in order to reduce a material cost and its weight.

Recent thin-film magnetic head elements, particularly magnetoresistive effect (MR) head elements are more multi-layered and more thinned to increase the recording density, and therefore have extremely weak structure against destruction due to an electrostatic discharge (ESD). Thus, during fabrication and assembling of the HAA and also after installed in a magnetic hard disk apparatus, it is necessary to take more effective countermeasures against the ESD destruction.

One of the effective countermeasures against the ESD destruction is to ground a thin-film magnetic head element to be protected. In this case, how ground the magnetic head element is important. Namely, when the magnetic head element is charged, how dissipates the static electrical charge is very important. This depends on electrical resistances of members arranged along a route of dissipation of the static electrical charge.

If the HAA is made of a good conductive material with a low resistance such as a metal material, the static electrical charge will easily dissipate. However, according to such good conductor material, since current per time becomes large, the magnetic head element will be easily destroyed. Contrary to this, if the HAA is made of an insulation material, the static electrical charge will not dissipate at all causing the amount of static electrical charge to increase. Thus, important is to properly adjust the electrical resistances of members arranged along the route of dissipation of the static electrical charge.

The main body of the HAA, namely the actuator arms and the base section, configures the route of dissipation of the static electrical charge, and is almost made of a metal material. Thus, the resistance of the route of dissipation of the static electrical charge is low and therefore ESD destruction of the thin-film magnetic head elements may easily occur. To solve this problem, it may be consider to change the material of the main body from the metal material such as an aluminum material to other material. However, there is little kind of material to use as the main body of the HAA and thus it is very difficult to find an appropriate material satisfying not only the ESD countermeasures but also the inherent functions of the HAA and the material cost.

SUMMARY OF THE INVENTION

It is therefore an object of the present invention to provide an HAA, a disk apparatus with an HAA and a manufacturing method of an HAA, which can dissipate static electrical charge without inducing ESD destruction of the head element even if the same material as the conventional one is used for a main body of the HAA.

According to the present invention, an HAA has at least one HGA, each including a head slider with at least one head element, a suspension for supporting the head slider, and a lead conductor member electrically connected with the at least one head element, and a main body including at least one actuator arm for supporting the at least one HGA. The main body of the HAA is made of a metal material, and a surface of the main body is coated by a diamond-like carbon (DLC) film. A disk apparatus according to the present invention is provided with the aforementioned HAA.

The main body of the HAA, including the actuator arm, is made of a metal material and a DLC film is coated over a surface of the main body. Thus, an electrical resistance of the surface of the main body can be set to a proper value for dissipating static electrical charge to prevent ESD destruction of the head element without modifying the material of the main body. Particularly, since most of the ESD charges flow through the surface of the body, adjustment of a sheet resistance of the surface by the coating of the DLC film is extremely effective as a countermeasures against ESD destruction. As is well known, during the manufacturing and assembling processes of the HAA and also after the HAA is mounted in the disk apparatus, since the main body of the HAA is actually grounded or equivalently grounded by electrically connecting it with a larger volume member, the ESD current will flow through the DLC film coated over the main body of the HAA.

By coating the surface of the main body with the DLC film, fine particles of the metal material can be prevented from flaking off during the assembly process that will be necessarily performed in the assembling process after coating the DLC film. Furthermore, the resistance of the DLC film can be controlled easier than that of a film of a metal oxide material or of a conductive-powder containing resin material. Also, thickness control of the DLC film is easy and therefore the DLC film can be formed in a uniform thickness. Thus, the DLC film can be coated without spoiling the accuracy in size of the main body of the HAA.

It is preferred that the metal material is an aluminum material. Using of the aluminum material for the main body of the HAA presents a low manufacturing cost and also a light weight of the HAA. Also, since the main body is coated by the DLC film, fine aluminum particles can be prevented from flaking off during the assembly process.

Preferably, the DLC film has a sheet resistance in the order of $10^6$ to $10^{10}$ $\Omega$, more preferably, in the order of $10^9$ $\Omega$. Thus, static electrical charge can be effectively dissipated without inviting the ESD destruction.

It is preferred that the assembly further has a coil member of an actuator for driving the at least one actuator arm to swing around an axis.

It is preferred that the at least one head element is a thin-film magnetic head element.

According to the present invention, also, a manufacturing method of an HAA includes a step of preparing at least one HGA, each including a head slider with at least one head element, a suspension for supporting the head slider, and a first lead conductor member electrically connected with the at least one head element, a step of preparing a main body of the HAA, the main body including at least one actuator arm and being made of a metal material, a step of depositing a DLC film to coat a surface of the main body, a step of attaching a second lead conductor member to the main body coated by the DLC film, a step of mounting the at least HGA onto the at least one actuator arm of the main body coated by the DLC film, and a step of electrically connecting the first lead conductor member with the second lead conductor member.

The DLC film is a film developed to realize a composition near to that of a diamond originally. When depositing the DLC film, it is possible to control the binding state between carbons from a diamond state to a graphite state by adjusting process conditions. As is known, the diamond is an insulator whereas the graphite is a conductor. Thus, it is easy to keep a composition ratio of them at a desired constant value by controlling the deposition conditions resulting easy management of the resistance value of the DLC film. Also, thickness control of the DLC film is easy and therefore the DLC film can be formed in a uniform thickness. Thus, the DLC film can be coated without spoiling the accuracy in size of the main body of the HAA. Furthermore, by coating the surface of the main body with the DLC film, fine particles of the metal material can be prevented from flaking off during the assembly process that will be necessarily performed in the assembling process after coating the DLC film.

It is preferred that the metal material is an aluminum material.

Preferably, the depositing step includes depositing a diamond-like carbon film to coat a surface of the main body under a deposition condition for forming the DLC film with a sheet resistance in the order of $10^6$ to $10^{10}$ Ω, more preferably in the order of $10^9$ Ω.

It is preferred that the depositing step includes depositing a DLC film to coat a surface of the main body by a plasma chemical vapor deposition (CVD), an ionization assisted deposition or a sputtering.

It is also preferred that the DLC film is made of a material with a composition of CH, CHN or CHSi.

It is preferred that the method further includes a step of attaching a coil member of an actuator to the main body. The coil member attaching step is executed after the depositing step but before the second lead conductor member attaching step.

It is further preferred that the method further includes a step of attaching a bearing member to an axis of the main body. The bearing member attaching step is executed after the coil member attaching step.

Further objects and advantages of the present invention will be apparent from the following description of the preferred embodiments of the invention as illustrated in the accompanying drawings.

DESCRIPTION OF THE PREFERRED EMBODIMENTS

Figure 1:
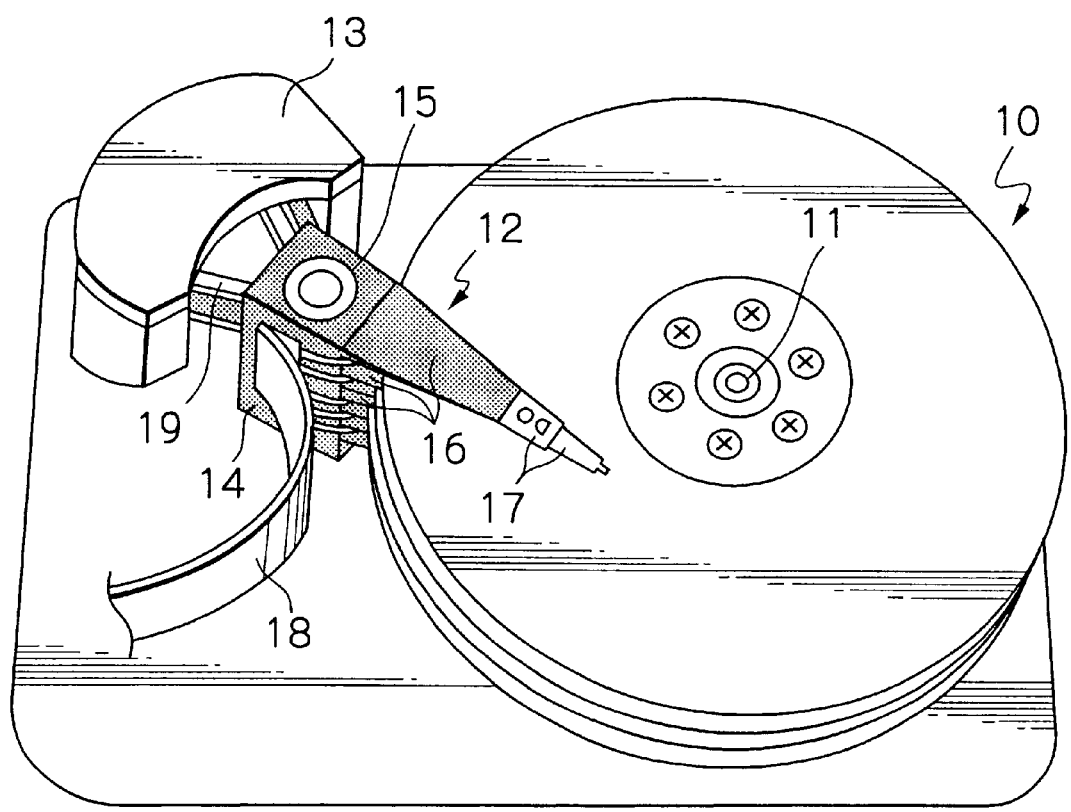
FIG. 1 shows an oblique view schematically illustrating main components of a magnetic hard disk drive apparatus in a preferred embodiment according to the present invention.
Figure 2:
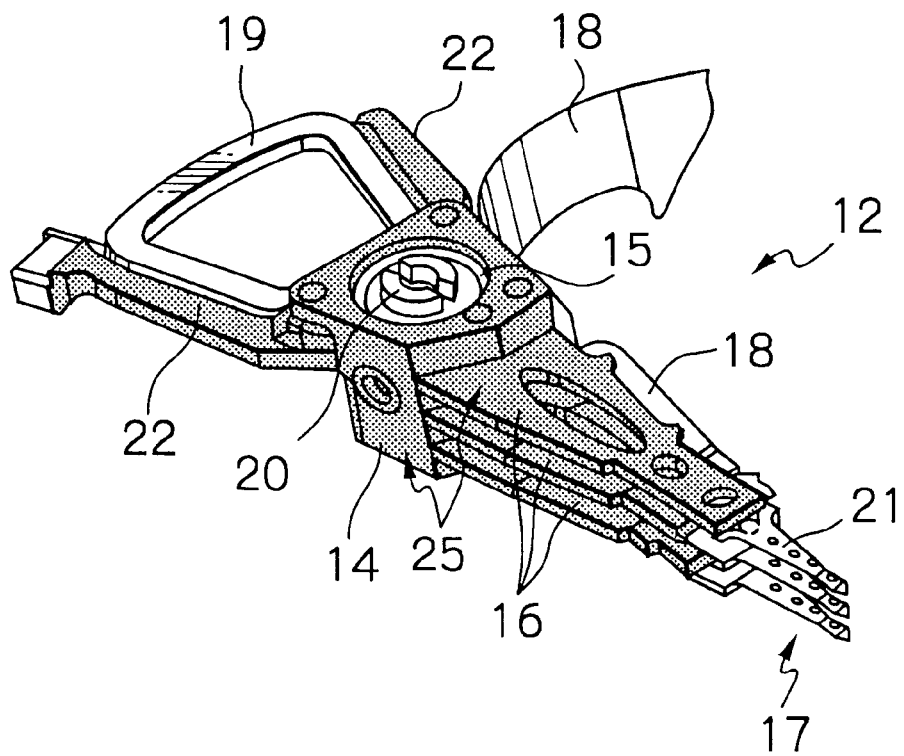
FIG. 2 shows an oblique view illustrating the whole structure of an HAA in the embodiment of FIG. 1.
Figure 3:
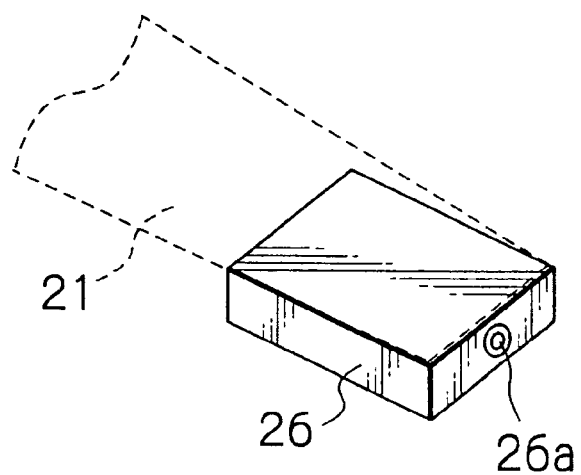
FIG. 3 shows an oblique view illustrating a magnetic head slider attached at a top end section of a suspension in the embodiment of FIG. 1.

FIG. 1 illustrates main components of a magnetic hard disk apparatus of a preferred embodiment according to the present invention, FIG. 2 illustrates the whole structure of an HAA in this embodiment, and FIG. 3 illustrates a magnetic head slider attached at a top end section of a suspension in this embodiment.

In FIG. 1, reference numeral 10 denotes a plurality of magnetic hard disks rotating around an axis 11, 12 denotes an HAA, and 13 denotes a part of a VCM for driving the HAA 12 to swing in cooperation with a coil section formed in this HAA 12, respectively.

As shown in FIGS. 1 to 3, the HAA 12 is substantially configured by a base section 14, a plurality of, three in this example, actuator arms 16 that are stacked along an axis 15, extended frontward from the base section 14 and capable of swinging around the axis 15, HGAs 17 fixed to top end sections of the respective actuator arms 16, a link lead conductor member consisting of a link flexible print circuit (link FPC) 18, a coil section 19 of the VCM, extending backward from the base section 14, and a bearing 20 (FIG. 2) inserted into the base section 14 at the axis 15.

Each HGA 17 has a suspension 21, a magnetic head slider 26 fixed to a top end section of the suspension 21 and provided with at least one thin-film magnetic head such as a MR head element 26a, a lead conductor member consisting of a flexible print circuit (FPC). One end of the FPC is electrically connected with the thin-film magnetic head element.

The other end of the FPC of the HGA 17 is electrically connected with one end of the link FPC 18 of the HAA 12. This one end of the link FPC 18 is also electrically connected with the coil section 19 of the VCM. At the other end of the link FPC 18, external connection pads used for connecting with an external circuit. An IC chip 24 (FIG. 7) including a head amplifier for the magnetic head element is mounted on the link FPC 18 at its midpoint.

Important points in this embodiment are (1) the main body of the HAA 12, namely the base section 14, a frame 22 for holding the coil section 19 extended backward from the base section 14 and the actuator arms 16, that are in other words the remaining parts of the HAA 12 out of the HGAs 17, the link FPC 18, the coil section 19 and the bearing 20, is made of an aluminum material; and (2) the whole surface of the main body of the HAA 12 is coated by a DLC (diamond-like carbon) film 25.

Using of the aluminum material for the main body of the HAA 12 presents a low manufacturing cost and a light weight of the HAA.

The DLC film 25 will be formed to have preferably a sheet resistance in the order of $10^6$ to $10^{10}$ Ω. The sheet resistance is most preferably in the order of $10^9$ Ω. By setting the sheet resistance of the DLC film 25 in this region, static electrical current can be effectively dissipated without inviting the ESD destruction. Since most of the ESD charges will flow through a surface of a member, adjustment of a sheet resistance of the surface by the coating of the DLC film is extremely effective as a countermeasures against ESD destruction. Furthermore, by coating the surface of the main body with the DLC film 25, fine particles of the aluminum material can be prevented from flaking off during the assembly process that will be necessarily performed in the assembling process after coating the DLC film.

It should be noted that the resistance of the DLC film can be controlled easier than that of a film of a metal oxide material or of a conductive-powder containing resin material. Also, thickness control of the DLC film is easy and therefore the DLC film can be formed in a uniform thickness. Thus, the DLC film 25 can be coated without spoiling the accuracy in size of the actuator arms 16.

FIGS. 4 to 7 illustrate partial processes of a manufacturing method of the HAA 12 of FIG. 2. Hereinafter, the manufacturing processes of the HAA will be described with reference to FIGS. 2 and 4 to 7.

Figure 4:
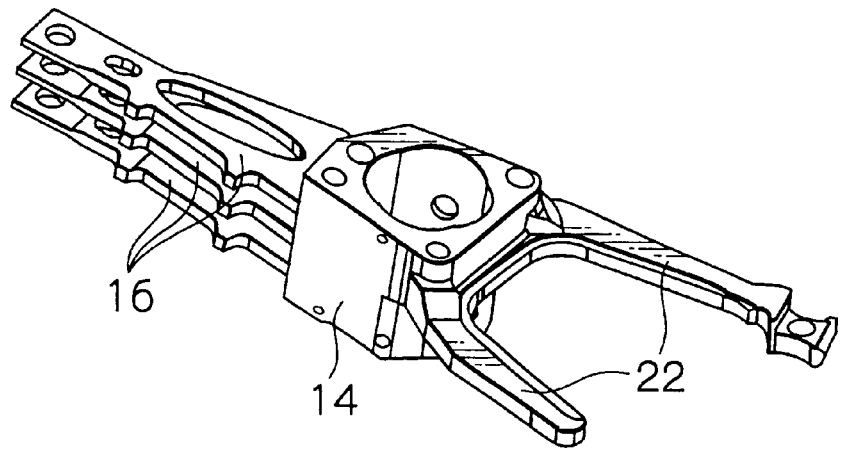
FIG. 4 shows an oblique view illustrating a partial process of a manufacturing method of the HAA of FIG. 2.

First, as shown in FIG. 4, the main body of the HAA 12, namely the base section 14, the frame 22 for holding the coil section 19, extended backward from the base section 14 and the actuator arms 16 is formed by an aluminum material.

Figure 5:
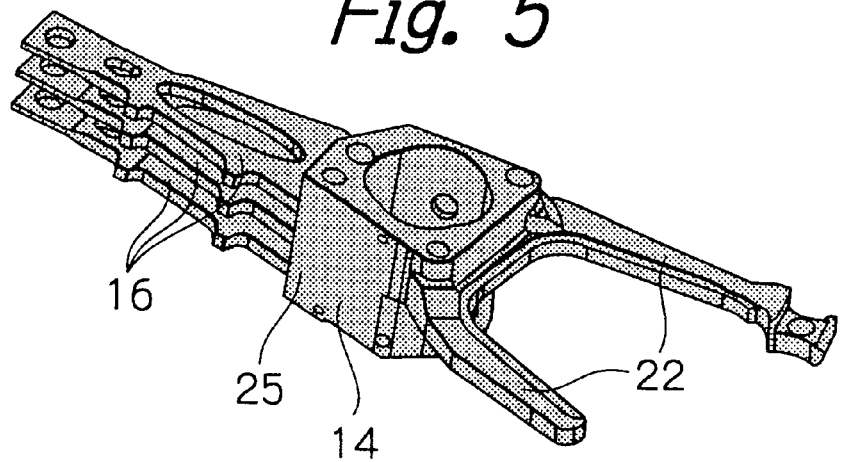
FIG. 5 shows an oblique view illustrating a partial process of a manufacturing method of the HAA of FIG. 2.

Then, as shown in FIG. 5, over the whole surface of the main body made of the aluminum material, the DLC film 25 is coated. Deposition of this DLC film is carried out as follows.

The deposition process of the DLC film 25 is not limited to a specific one. However, it is desired to use a plasma CVD, an ionization assisted deposition or a sputtering.

Plasma CVD

The plasma CVD is well known. For example it is described in Japanese patent publication 04041672A. Plasma used in the plasma CVD for depositing the DLC film may be DC or AC plasma, preferably AC plasma with a frequency of several Hz to microwave band. ECR (electron cyclotron resonance) plasma described in Diamond Thin-Film Technique issued from Sogo Gijutu Center Co., Ltd. may be also used in the plasma CVD for depositing the DLC film.

As for the plasma CVD, it is desired to use a biased plasma CVD described in detail in for example M. Nakayama et al, Journal of the Ceramic Society of Japan, Int. Edition Vol.98, 607–609 (1990). In this biased plasma CVD, an external negative bias voltage is applied to a target or the main body of the HAA over which surface a film is to be deposited. Self-biasing without applying the external bias voltage may be utilized. When a plasma power source that is an AC power source is connected to electrodes of a plasma CVD instrument, a plasma will be produced. This plasma includes electrons, ions and radicals and is electrically neutral as a whole. However, when the frequency of the plasma power source increases to an audio wave frequency (AF), a radio frequency (RF) or micro wave frequency (MW), difference will occur in mobility of the ions and the electrons and thus a negative voltage will automatically generate at the voltage applied electrode (in general ungrounded electrode). This negative voltage is called as a self-biasing voltage. The bias voltage is preferably −10 to −2000 V, more preferably −50 to −1000 V.

When the DLC film is prepared by plasma CVD, it is desired to use a compound gas containing C and H as a reaction gas. However, a compound gas containing C or a compound gas containing H can be used. The compound gas containing C and H may be hydro carbons such as for example $CH_4$, $C_2H_4$, $C_2H_6$, $C_3H_8$ or $C_6H_6$. The compound gas containing C may be for example CO or $CO_2$. The compound gas containing H may be for example $H_2$, $H_2O$ or $NH_3$. A compound gas containing neither C nor H, for example a compound gas expressed with $NO_x$ such as NO, $NO_2$ or $N_2O$, or $N_2$ can be used together if needed.

A flow rate of the reaction gas will be appropriately determined depending upon a reaction gas used. Preferably, a gas pressure is in general 0.01 to 0.5 Torr, and an applied power is in general about 10 W to 5 kW.

Ionization Assisted Deposition

The ionization deposition is described in for example Japanese patent publications 58174507A and 59174508A. Of course, other ionization assisted deposition executing acceleration of ionized gas may be used for preparing the DLC film. An ion straight-ahead type or ion deviation type instrument described in Japanese utility model publication 59174507A may be desired for the ionization assisted deposition for preparing the DLC film.

In this ionization assisted deposition, a vacuum chamber is kept in a high vacuum at about $10^{-6}$ Torr. In this vacuum chamber, a filament heated by an AC power to generate thermal electrons and an opposing electrode surrounding the filament are arranged and a voltage Vd is applied across the filament and the electrode. Also, in the chamber, an electromagnetic coil for producing a magnetic flux to confine the ionized gas is arranged to surround the filament and the electrode. Thus, a reaction gas collides with thermal electrons from the filament to produce positive heat decomposition ions and electrons. The heat decomposition ions are accelerated by the negative potential Va applied to a grid, and collide with a substrate or the main body of the HAA to deposit a film.

In such ionization deposition, composition and quality of the DLC film to be deposited can be controlled by adjusting the voltage Vd, the voltage Va and the magnetic flux produced from the coil. The voltage Vd is preferably 10 to 500 V, and the voltage Va is preferably −10 to −500 V. Also, preferably, a negative external bias voltage is applied to the substrate. Self-biasing without applying the external bias voltage may be utilized. The bias voltage is preferably −10 to −2000 V, more preferably −50 to −1000 V.

When the DLC film is prepared by ionization deposition, the same compound gas as that in the plasma CVD may be used. A flow rate of the reaction gas will be appropriately determined depending upon a reaction gas used. Preferably, a gas pressure is in general 0.01 to 0.5 Torr.

Sputtering

When the DLC film is prepared by sputtering, it is preferred to use a RF sputtering. More preferably, a reactive sputtering using C as a target and using $H_2$ or $NH_3$ as a reaction gas. It is possible to use a polymer containing C and H as the target. Also, preferably, a negative external bias voltage is applied to a substrate or the main body of the HAA to deposit a film. Self-biasing without applying the external bias voltage may be utilized. The bias voltage is preferably −10 to −2000 V, more preferably −50 to −1000 V. Preferably, a gas pressure is in general $10^{-5}$ to $10^{-3}$ Torr, and a RF sputtering power is in general about 50 W to 2 kW.

Preparation of DLC Film Samples by Plasma CVD

Samples of a DLC film were actually deposited by plasma CVD with different deposition conditions, and sheet resistances of the deposited DLC film samples were measured. The measured results are as follows.

Sample 1

A thickness of the deposited DLC film was 0.8 μm. Deposition conditions were as follows:

| Reaction gas | $C_2H_2$ |
|---|---|
| Flow rate of the $C_2H_2$ gas | 0.17 Pa m$^2$s$^{-1}$ (100 sccm) |
| Power source | RF (13.56 MHz) |
| Gas pressure | 66.5 Pa (0.5 Torr) |
| Applied power | 500 W |
| Deposition rate | 100 nm/min |

Composition of the deposited DLC film was $CH_{0.33}$. A surface electrical resistance of the DLC film was measured by an insulation resistance tester. The measured sheet resistance was $10^{10}$ Ω.

Sample 2

A thickness of the deposited DLC film was 0.8 μm. Deposition conditions were as follows:

| Reaction gas | $C_2H_2$ |
|---|---|
| Flow rate of the $C_2H_2$ gas | 0.085 Pa m$^2$s$^{-1}$ (50 sccm) |
| Power source | RF (13.56 MHz) |
| Gas pressure | 66.5 Pa (0.5 Torr) |
| Applied power | 800 W |
| Deposition rate | 120 nm/min |

Composition of the deposited DLC film was $CH_{0.29}$. A surface electrical resistance of the DLC film was measured by an insulation resistance tester. The measured sheet resistance was $10^{8.5}$ Ω.

Sample 3

A thickness of the deposited DLC film was 0.7 μM. Deposition conditions were as follows:

| Reaction gas | $C_2H_2$ |
|---|---|
| Flow rate of the $C_2H_2$ gas | 0.07 Pa m$^2$s$^{-1}$ (40 sccm) |
| Reaction gas | $N_2$ |
| Flow rate of the $N_2$ gas | 0.02 Pa m$^2$s$^{-1}$ (12 sccm) |
| Power source | RF (13.56 MHz) |
| Gas pressure | 66.5 Pa (0.5 Torr) |
| Applied power | 500 W |
| Deposition rate | 80 nm/min |

Composition of the deposited DLC film was $CH_{0.26}N_{0.18}$. A surface electrical resistance of the DLC film was measured by an insulation resistance tester. The measured sheet resistance was $10^6$ Ω.

Sample 4

A thickness of the deposited DLC film was 0.5 μm. Deposition conditions were as follows:

| Reaction gas | $Si(CH_3)_4$ |
|---|---|
| Flow rate of the $Si(CH_3)_4$ gas | 0.085 Pa m$^2$s$^{-1}$ (50 sccm) |
| Reaction gas | $CH_4$ |
| Flow rate of the $CH_4$ gas | 0.085 Pa m$^2$s$^{-1}$ (50 sccm) |
| Power source | RF (13.56 MHz) |
| Gas pressure | 66.5 Pa (0.5 Torr) |
| Applied power | 500 W |
| Deposition rate | 90 nm/min |

Composition of the deposited DLC film was $CH_{0.20}Si_{0.1}$. A surface electrical resistance of the DLC film was measured by an insulation resistance tester. The measured sheet resistance was $10^8$ Ω.

As mentioned above, by appropriately adjusting the deposition conditions, the DLC film 25 with a sheet resistance preferably in the order of $10^6$ to $10^{10}$ Ω, most preferably in the order of $10^9$ Ω is deposited over the main body of the HAA 12.

Figure 6:
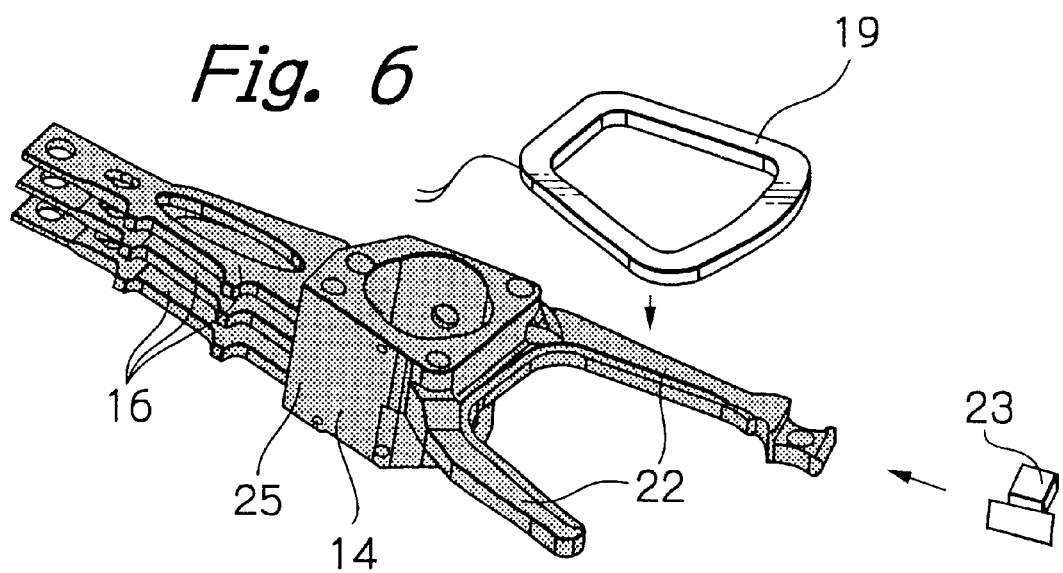
FIG. 6 shows an oblique view illustrating a partial process of a manufacturing method of the HAA of FIG. 2.

Thereafter, as shown in FIG. 6, the coil section 19 and a collision-protection member 23 are assembled to the frame 22 of the DLC film coated main body of the HAA 12.

Figure 7:
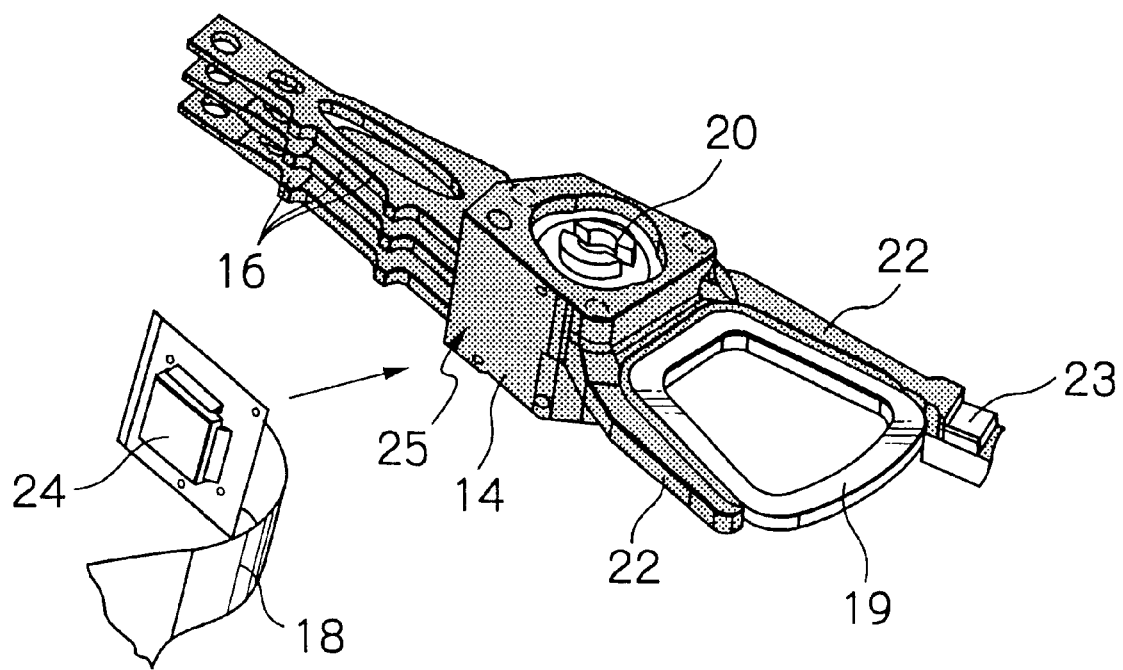
FIG. 7 shows an oblique view illustrating a partial process of a manufacturing method of the HAA of FIG. 2.

Then, as shown in FIG. 7, the bearing 20 is inserted into the axis 15 of the base section 14 of the HAA, and the link FPC 18 with the IC chip 24 preliminarily mounted on its midpoint is attached to the base section 14. At this stage, one end of the link FPC 18 is electrically connected with the coil section 19.

Then, as shown in FIG. 2, the HGAs 17 are fixed to the top end section of the respective actuator arms 16 by swaging, and one end of the link FPC 18 is electrically connected with one end of the FPC. The other end of this FPC has been electrically connected with the thin-film magnetic head element 26a (FIG. 3).

As will be noted that the resistance of the DLC film 25 can be easily controlled to a desired value by properly adjusting the deposition conditions. Also, thickness control of the DLC film 25 is easy and therefore the DLC film 25 can be formed in a uniform thickness. Thus, the DLC film 25 can be coated without spoiling the accuracy in size of the main body of the HAA 12. Moreover, by coating the surface of the main body with the DLC film 25, fine particles of the aluminum material can be prevented from flaking off during the assembly process that will be necessarily performed in the assembling process after coating the DLC film.

As aforementioned, the DLC film 25 is formed to have preferably a sheet resistance in the order of $10^6$ to $10^{10}$ Ω, most preferably in the order of $10^9$ Ω. Thus, static electrical charge can be effectively dissipated without inviting the ESD destruction. Since most of the ESD charges flow through a surface of a member, adjustment of a sheet resistance of the surface by the coating of the DLC film is extremely effective as a countermeasures against ESD destruction. In addition, using of the aluminum material for the main body of the HAA 12 presents a low manufacturing cost and also a light weight of the HAA.

In the aforementioned embodiments, the HAA having the magnetic head slider with the thin-film magnetic head element is described. However, it is apparent that the present invention can be applied to an HAA with a head element such as an optical head element other than the thin-film magnetic head element.

Many widely different embodiments of the present invention may be constructed without departing from the spirit and scope of the present invention. It should be understood that the present invention is not limited to the specific embodiments described in the specification, except as defined in the appended claims.

What is claimed is:

1. A head arm assembly comprising:
    at least one head gimbal assembly, each including a head slider with at least one head element, a suspension for supporting said head slider, and a lead conductor member electrically connected with said at least one head element; and
    a main body including at least one actuator arm for supporting said at least one head gimbal assembly, said main body being made of a metal material, and a surface of said main body being coated by a diamond-like carbon film.

2. The head arm assembly as claimed in claim 1, wherein said metal material is an aluminum material.

3. The head arm assembly as claimed in claim 1, wherein said diamond-like carbon film has a sheet resistance in the order of $10^6$ to $10^{10}$ Ω.

4. The head arm assembly as claimed in claim 3, wherein said diamond-like carbon film has a sheet resistance in the order of $10^9$ Ω.

5. The head arm assembly as claimed in claim 1, wherein said assembly further comprises a coil member of an actuator for driving said at least one actuator arm to swing around an axis.

6. The head arm assembly as claimed in claim 1, wherein said at least one head element is a thin-film magnetic head element.

7. A disk apparatus provided with a head arm assembly comprising:
   at least one head gimbal assembly, each including a head slider with at least one head element, a suspension for supporting said head slider, and a lead conductor member electrically connected with said at least one head element; and
   a main body including at least one actuator arm for supporting said at least one head gimbal assembly, said main body being made of a metal material, and a surface of said main body being coated by a diamond-like carbon film.

8. The disk apparatus as claimed in claim 7, wherein said metal material is an aluminum material.

9. The disk apparatus as claimed in claim 7, wherein said diamond-like carbon film has a sheet resistance in the order of $10^6$ to $10^{10}$ Ω.

10. The disk apparatus as claimed in claim 9, wherein said diamond-like carbon film has a sheet resistance in the order of $10^9$ Ω.

11. The disk apparatus as claimed in claim 7, wherein said assembly further comprises a coil member of an actuator for driving said at least one actuator arm to swing around an axis.

12. The disk apparatus as claimed in claim 7, wherein said at least one head element is a thin-film magnetic head element.

13. A manufacturing method of a head arm assembly comprising the steps of:
   preparing at least one head gimbal assembly, each including a head slider with at least one head element, a suspension for supporting said head slider, and a first lead conductor member electrically connected with said at least one head element;
   preparing a main body of the head arm assembly, said main body including at least one actuator arm and being made of a metal material;
   depositing a diamond-like carbon film to coat a surface of said main body;
   attaching a second lead conductor member to said main body coated by the diamond-like carbon film;
   mounting said at least one head gimbal assembly onto said at least one actuator arm of said main body coated by the diamond-like carbon film; and
   electrically connecting said first lead conductor member with said second lead conductor member.

14. The manufacturing method as claimed in claim 13, wherein said metal material is an aluminum material.

15. The manufacturing method as claimed in claim 13, wherein said depositing step comprises depositing a diamond-like carbon film to coat a surface of said main body under a deposition condition for forming said diamond-like carbon film with a sheet resistance in the order of $10^6$ to $10^{10}$ Ω.

16. The manufacturing method as claimed in claim 13, wherein said deposition of a diamond-like carbon film is performed under a deposition condition for forming said diamond-like carbon film with a sheet resistance in the order of $10^9$ Ω.

17. The manufacturing method as claimed in claim 13, wherein said depositing step comprises depositing a diamond-like carbon film to coat a surface of said main body by a plasma chemical vapor deposition.

18. The manufacturing method as claimed in claim 13, wherein said depositing step comprises depositing a diamond-like carbon film to coat a surface of said main body by an ionization assisted deposition.

19. The manufacturing method as claimed in claim 13, wherein said depositing step comprises depositing a diamond-like carbon film to coat a surface of said main body by a sputtering.

20. The manufacturing method as claimed in claim 13, wherein said diamond-like carbon film is made of a material with a composition of CH.

21. The manufacturing method as claimed in claim 13, wherein said diamond-like carbon film is made of a material with a composition of CHN.

22. The manufacturing method as claimed in claim 13, wherein said diamond-like carbon film is made of a material with a composition of CHSi.

23. The manufacturing method as claimed in claim 13, wherein said method further comprises a step of attaching a coil member of an actuator to said main body, said coil member attaching step being executed after said depositing step but before said second lead conductor member attaching step.

24. The manufacturing method as claimed in claim 23, wherein said method further comprises a step of attaching a bearing member to an axis of said main body, said bearing member attaching step being executed after said coil member attaching step.

* * * * *